US012380874B2

(12) United States Patent
Arnao

(10) Patent No.: US 12,380,874 B2
(45) Date of Patent: Aug. 5, 2025

(54) DIGITAL TONE SYNTHESIZERS

(71) Applicant: The ADT Security Corporation, Boca Raton, FL (US)

(72) Inventor: Michael A. Arnao, Collegeville, PA (US)

(73) Assignee: The ADT Security Corporation, Boca Raton, FL (US)

( * ) Notice: Subject to any disclaimer, the term of this patent is extended or adjusted under 35 U.S.C. 154(b) by 0 days.

(21) Appl. No.: 18/495,449

(22) Filed: Oct. 26, 2023

(65) Prior Publication Data

US 2024/0331680 A1 Oct. 3, 2024

Related U.S. Application Data

(63) Continuation of application No. 18/193,850, filed on Mar. 31, 2023, now Pat. No. 11,837,212.

(51) Int. Cl.
*G10K 15/02* (2006.01)
*H04R 3/04* (2006.01)

(52) U.S. Cl.
CPC ............... *G10K 15/02* (2013.01); *H04R 3/04* (2013.01)

(58) Field of Classification Search
None
See application file for complete search history.

(56) References Cited

U.S. PATENT DOCUMENTS 4,395,931 A 8/1983 Wachi
6,101,469 A 8/2000 Curtin
6,208,969 B1 3/2001 Curtin
7,317,958 B1 1/2008 Freed et al.
2021/0043180 A1 2/2021 Burrowes et al.

FOREIGN PATENT DOCUMENTS

WO WO-9303478 A1 * 2/1993 ............. G10H 7/105
WO WO-2016042244 A1 * 3/2016 ............. G10K 15/02

OTHER PUBLICATIONS

P.R. Symons; Hardward and Algorithm architectures for real-time additive synthesis; PhD Thesis; The Open University; 2005, consisting of 371-pages.
G. De Poli et al.; Sound modeling: signal-based approaches; Algorithms for Sound and Music Computing; Oct. 30, 2009, consisting of 65-pages.

* cited by examiner

*Primary Examiner* — James K Mooney
(74) *Attorney, Agent, or Firm* — Weisberg I.P. Law. P.A.

(57) ABSTRACT

A method implemented in an audio synthesis device for synthesizing an audio signal is provided. The method includes determining a first plurality of harmonics based on a sinusoidal oscillator, at least two of the first plurality of harmonics being calculated in parallel, scaling the first plurality of harmonics according to a scaling parameter, determining a first sum of the first plurality of scaled harmonics to generate a first sample of the plurality of samples, determining a second plurality of harmonics based on the sinusoidal oscillator, at least two of the second plurality of harmonics being calculated in parallel, scaling the second plurality of harmonics according to the scaling parameter, determining a second sum of the second plurality of scaled harmonics to generate a second sample of the plurality of samples, and causing playback, on the speaker, of at least the first sample and the second sample.

20 Claims, 3 Drawing Sheets

DIGITAL TONE SYNTHESIZERS

CROSS-REFERENCE TO RELATED PATENT APPLICATION

This application is a continuation of and claims priority to U.S. Utility patent application Ser. No. 18/193,850, filed on Mar. 31, 2023, entitled DIGITAL TONE SYNTHESIZERS, the entirety of which is incorporated herein by reference.

TECHNICAL FIELD

The present technology is generally related to configurations for supporting digital synthesis of tones.

BACKGROUND

In a range of industries, there are devices that generate periodic tones such as square, pulse, triangle, and sawtooth waves. Periodic tones may be used in a wide variety of applications, e.g., sirens, alarms, alerts, function generators, musical instruments, etc. A common property of such tones is harmonicity: each consists of a weighted sum of sinusoids at frequencies that are integer multiples of a fundamental frequency.

Existing implementations of periodic tones include mechanical, electromechanical, analog, and digital designs. A digital implementation may offer both stability and flexibility. Examples of techniques within this class of digital implementation are direct synthesis, wavetable synthesis, bandlimited impulse train (BLIT) synthesis, and additive synthesis. In the case of additive synthesis, a tone is built as the sum of its sinusoidal components.

BRIEF DESCRIPTION OF THE DRAWINGS

A more complete understanding of the present invention, and the attendant advantages and features thereof, will be more readily understood by reference to the following detailed description when considered in conjunction with the accompanying drawings wherein.

DETAILED DESCRIPTION

Figure 1:
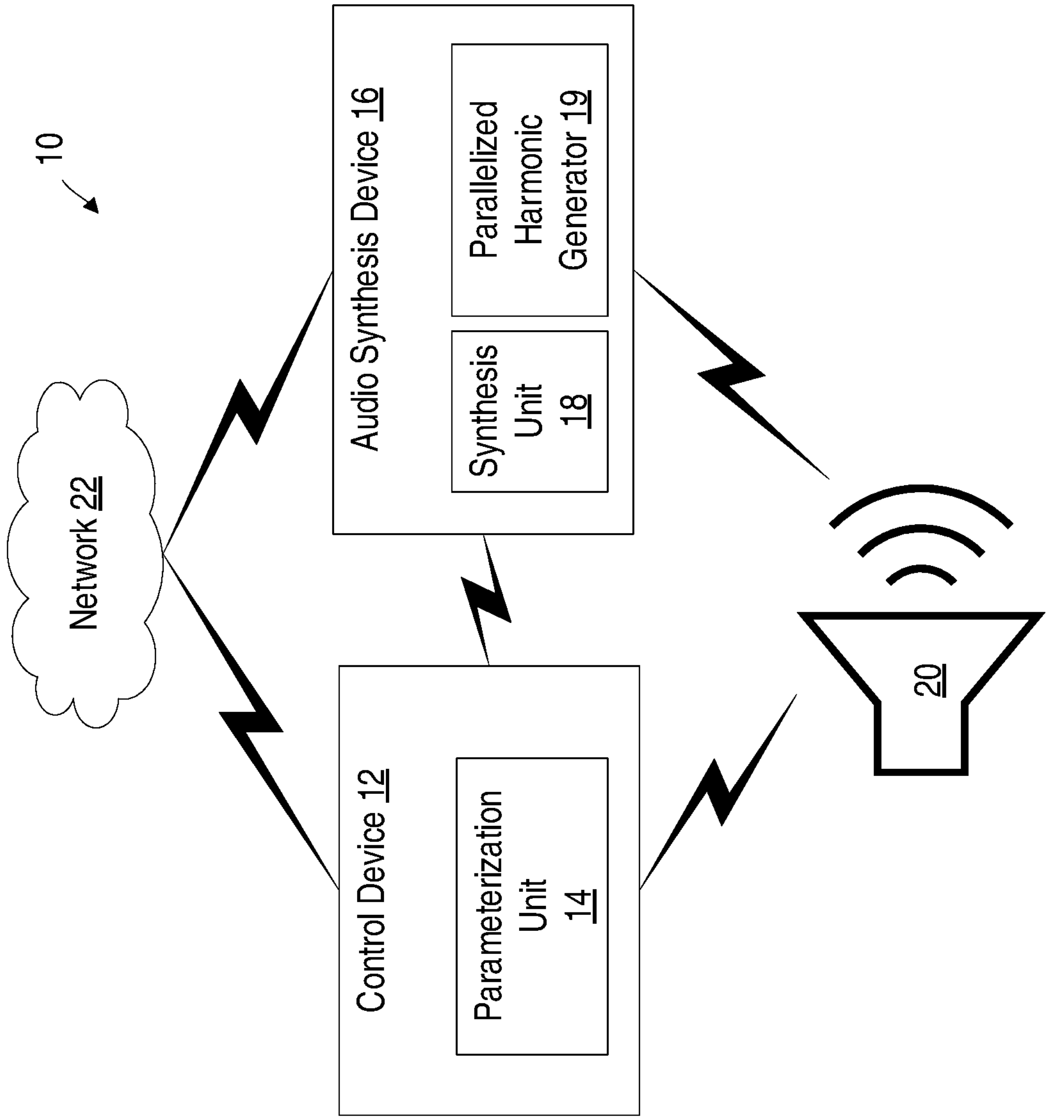
FIG. 1 is a schematic diagram of an example system according to some embodiments of the present disclosure.

Before describing in detail exemplary embodiments, it is noted that the embodiments may reside in combinations of apparatus components and processing steps related to digital audio synthesis of tones. Accordingly, components may be represented where appropriate by conventional symbols in the drawings, focusing on only those specific details that may facilitate understanding the embodiments so as not to obscure the disclosure with details that will be readily apparent to those of ordinary skill in the art having the benefit of the description herein.

As used herein, relational terms, such as “first” and “second,” “top” and “bottom,” and the like, may be used solely to distinguish one entity or element from another entity or element without necessarily requiring or implying any physical or logical relationship or order between such entities or elements. The terminology used herein is for the purpose of describing particular embodiments only and is not intended to be limiting of the concepts described herein. As used herein, the singular forms “a”, “an” and “the” are intended to include the plural forms as well, unless the context clearly indicates otherwise. It will be further understood that the terms “comprises,” “comprising,” “includes” and/or “including” when used herein, specify the presence of stated features, integers, steps, operations, elements, and/or components, but do not preclude the presence or addition of one or more other features, integers, steps, operations, elements, components, and/or groups thereof.

In embodiments described herein, the joining term, “in communication with” and the like, may be used to indicate electrical or data communication, which may be accomplished by physical contact, induction, electromagnetic radiation, radio signaling, infrared signaling or optical signaling, for example. One having ordinary skill in the art will appreciate that multiple components may interoperate and modifications and variations are possible of achieving the electrical and data communication.

In some embodiments described herein, the term “coupled,” “connected,” and the like, may be used herein to indicate a connection, although not necessarily directly, and may include wired and/or wireless connections.

Embodiments of the present disclosure may provide configurations for supporting a digital tone synthesizer that performs additive synthesis based on Chebyshev polynomials of the first kind computed using an efficient parallel form. Relative to existing systems, various embodiments of the present disclosure may achieve a faster or more efficient running time that is proportional to the log of the number of polynomials, while featuring, in some cases, a per-output computational complexity similar to that of existing systems.

Referring now to the drawing figures, in which like elements are referred to by like reference numerals, there is shown in FIG. 1 a schematic diagram of a system 10. System 10 may include a control device 12 (e.g., comprising parameterization unit 14), audio synthesis device 16 (e.g., comprising synthesis unit 18 and parallelized harmonic generator 19), and speaker 20 (which may be a separate device or may be a sub-component of a device, e.g., of the audio synthesis device 16, of a keypad, etc.). Control device 12 may be configured to receive, transmit, process, encode, and/or parameterize audio data, such as via parameterization unit 14. Audio synthesis device 16 may be configured to receive, transmit, process, synthesize audio data, e.g., based on one or more parameters received from control device 12. Speaker 20 may be configured to receive audio data (e.g., an analog or digital signal output from audio synthesis device 16) for playback.

In some embodiments, control device 12 may be any computing device that comprises sufficient computing resources, memory, storage to perform parameterization and/or is not substantially restrained by power limitations. For example, control device 12 may be a computer, server, cloud server, virtual computer, smartphone, etc.

In some embodiments, audio synthesis device 16 may be any computing device that comprises limited computing resources, memory, storage, power, and/or energy storage, which may benefit from various low-overhead audio synthesis techniques, as described herein. For example, audio synthesis device 16 may be an embedded device, embedded system, IoT device, reduced capability device, wired or wireless keypad device, premises security or safety control panel, security sensor, wearable device, system on a chip (SoC), etc. Audio synthesis device 16 is not limited to such devices, and may be other types of computing and/or audio processing devices.

In one or more embodiments, control device 12, audio synthesis device 16, and speaker 20 may be configured to communicate with each other via one or more communication links and protocols, e.g., to communicate audio data, which may be communicated in a compressed format, a decompressed format, a digital format, and/or an analog format. Further, system 10 may include network 22, which may be configured to provide direct and/or indirect communication, e.g., wired and/or wireless communication, between any two or more components of system 10, e.g., control device 12, audio synthesis device 16, and speaker 20. Although network 22 is shown as an intermediate network between components or devices of system 10, any component or device may communicate directly with any other component or device of system 10.

In some embodiments control device 12 may be at least temporarily co-located (e.g., in the same premises) as audio synthesis device 16. In other embodiments, control device 12 may be remote and/or separate from audio synthesis device 16, e.g., control device 12 may be located in a factory or software development setting where the audio synthesis device 16 is configured (e.g., via a direct physical connection and/or a remote and/or wireless connection) with the compressed audio output by the control device 12 and/or one or more intermediate devices. In some embodiments, audio synthesis device 16 may operate independently, e.g., without any control device 12.

Figure 2:
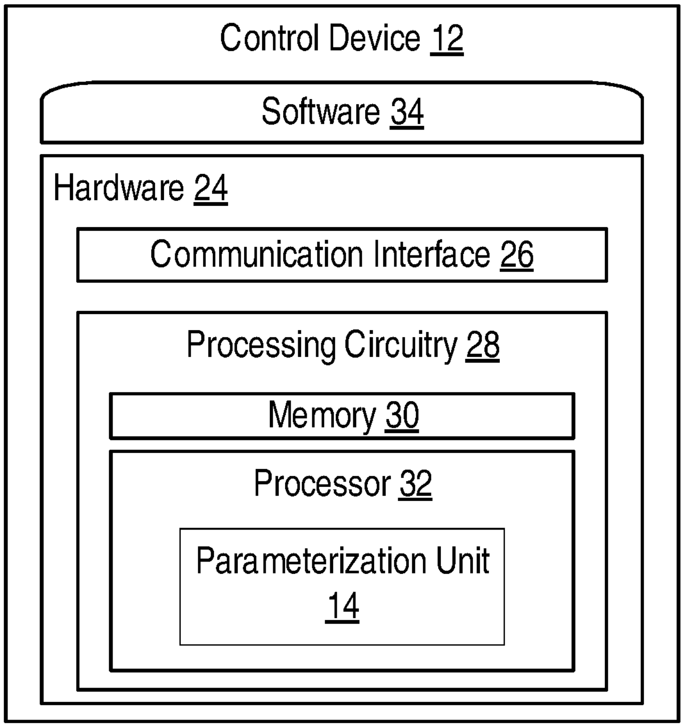
FIG. 2 is a block diagram of an example control device according to some embodiments of the present disclosure.

FIG. 2 shows an example control device 12, that may comprise hardware 24, including communication interface 26 and processing circuitry 28. The processing circuitry 28 may include a memory 30 and a processor 32. In addition to, or instead of a processor, such as a central processing unit, and memory, the processing circuitry 28 may comprise integrated circuitry for processing and/or control, e.g., one or more processors, processor cores, field programmable gate arrays (FPGAs) and/or application specific integrated circuits (ASICs) adapted to execute instructions. The processor 32 may be configured to access (e.g., write to and/or read from) the memory 30, which may comprise any kind of volatile and/or nonvolatile memory, e.g., cache, buffer memory, RAM, read-only memory (ROM), optical memory and/or erasable programmable read-only memory (EPROM).

Communication interface 26 may comprise and/or be configured to support communication between control device 12 and any other component of system 10. Communication interface 26 may include at least a radio interface configured to set up and maintain a wireless connection with network 22 and/or any component of system 10. The radio interface may be formed as, or may include, for example, one or more radio frequency, radio frequency (RF) transmitters, one or more RF receivers, and/or one or more RF transceivers. Communication interface 26 may include a wired communication interface, such as an Ethernet interface, configured to set up and maintain a wired connection with network 22 and/or any component of system 10.

Control device 12 may further include software 34 stored internally in, for example, memory 30 or stored in external memory (e.g., database, storage array, network storage device, etc.) accessible by control device 12 via an external connection. The software 34 may be executable by the processing circuitry 28. The processing circuitry 28 may be configured to control any of the methods and/or processes described herein and/or to cause such methods, and/or processes to be performed, e.g., by control device 12. Processor 32 corresponds to one or more processors 32 for performing control device 12 functions described herein. The memory 30 is configured to store data, programmatic software code and/or other information described herein. In some embodiments, the software 34 may include instructions that, when executed by the processor 32 and/or processing circuitry 28, causes the processor 32 and/or processing circuitry 28 to perform the processes described herein with respect to control device 12. For example, processing circuitry 28 may include parameterization unit 14 configured to perform one or more control device 12 functions as described herein such as determining one or more parameters for synthesis of audio tones and transmitting or causing transmission of the parameters to audio synthesis device 16 to enable audio synthesis device 16 to synthesize one or more audio tones, as described herein.

Figure 3:
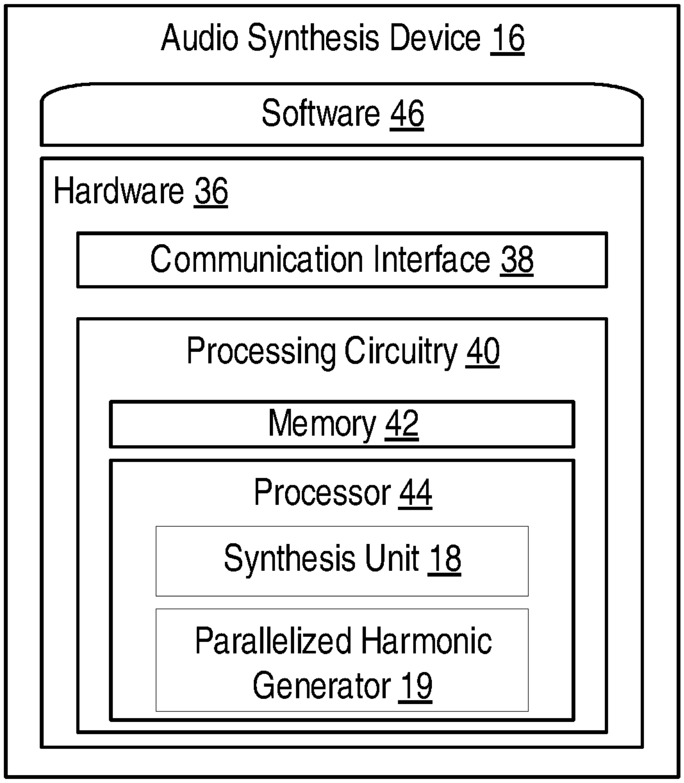
FIG. 3 is a block diagram of an example audio synthesis device according to some embodiments of the present disclosure.

FIG. 3 shows an example audio synthesis device 16, which may comprise hardware 36, including communication interface 38 and processing circuitry 40. The processing circuitry 40 may include a memory 42 and a processor 44. In addition to, or instead of a processor, such as a central processing unit, and memory, the processing circuitry 40 may comprise integrated circuitry for processing and/or control, e.g., one or more processors, processor cores, FPGAs and/or ASICs adapted to execute instructions. The processor 44 may be configured to access (e.g., write to and/or read from) the memory 42, which may comprise any kind of volatile and/or nonvolatile memory, e.g., cache, buffer memory, RAM, ROM, optical memory and/or EPROM.

In some embodiments, the processing circuitry 40 may comprise a SoC, which may include a limited quantity of memory 42 (e.g., less than 10 MB), and/or which may be configured to operate the processor 44 at a relatively low frequency (e.g., less than 10 MHz), e.g., as compared to processor 32, memory 30, etc.

Communication interface 38 may comprise and/or be configured to support communication between audio synthesis device 16 and any other component of system 10. Communication interface 38 may include at least a radio interface configured to set up and maintain a wireless connection with network 22 and/or any component of system 10. The radio interface may be formed as, or may include, for example, one or more RF transmitters, one or more RF receivers, and/or one or more RF transceivers. Communication interface 38 may include a wired communication interface, such as an Ethernet interface, configured to set up and maintain a wired connection with network 22 and/or any component of system 10.

Audio synthesis device 16 may further include software 46 stored internally in, for example, memory 42 or stored in external memory (e.g., database, storage array, network storage device, etc.) accessible by audio synthesis device 16 via an external connection. The software 46 may be executable by the processing circuitry 40. The processing circuitry 40 may be configured to control any of the methods and/or processes described herein and/or to cause such methods, and/or processes to be performed, e.g., by audio synthesis device 16. Processor 44 corresponds to one or more processors 44 for performing audio synthesis device 16 functions described herein. The memory 42 is configured to store data, programmatic software code and/or other information described herein. In some embodiments, the software 46 may include instructions that, when executed by the processor 44 and/or processing circuitry 40, causes the processor 44 and/or processing circuitry 40 to perform the processes described herein with respect to audio synthesis device 16. For example, processing circuitry 40 may include synthesis unit 18 configured to perform one or more audio synthesis device 16 functions as described herein such as receiving one or more parameters from the control device 12 and/or from memory 42, synthesizing one or more audio tones using the one or more parameters, as described herein, and providing the synthesized audio data and/or signal to speaker 20 for playback. As another example, processing circuitry 40 may include parallelized harmonic generator 19 configured to perform one or more audio synthesis device 16 functions as described herein such as performing a parallelized computation of harmonics, as described herein.

Figure 4:
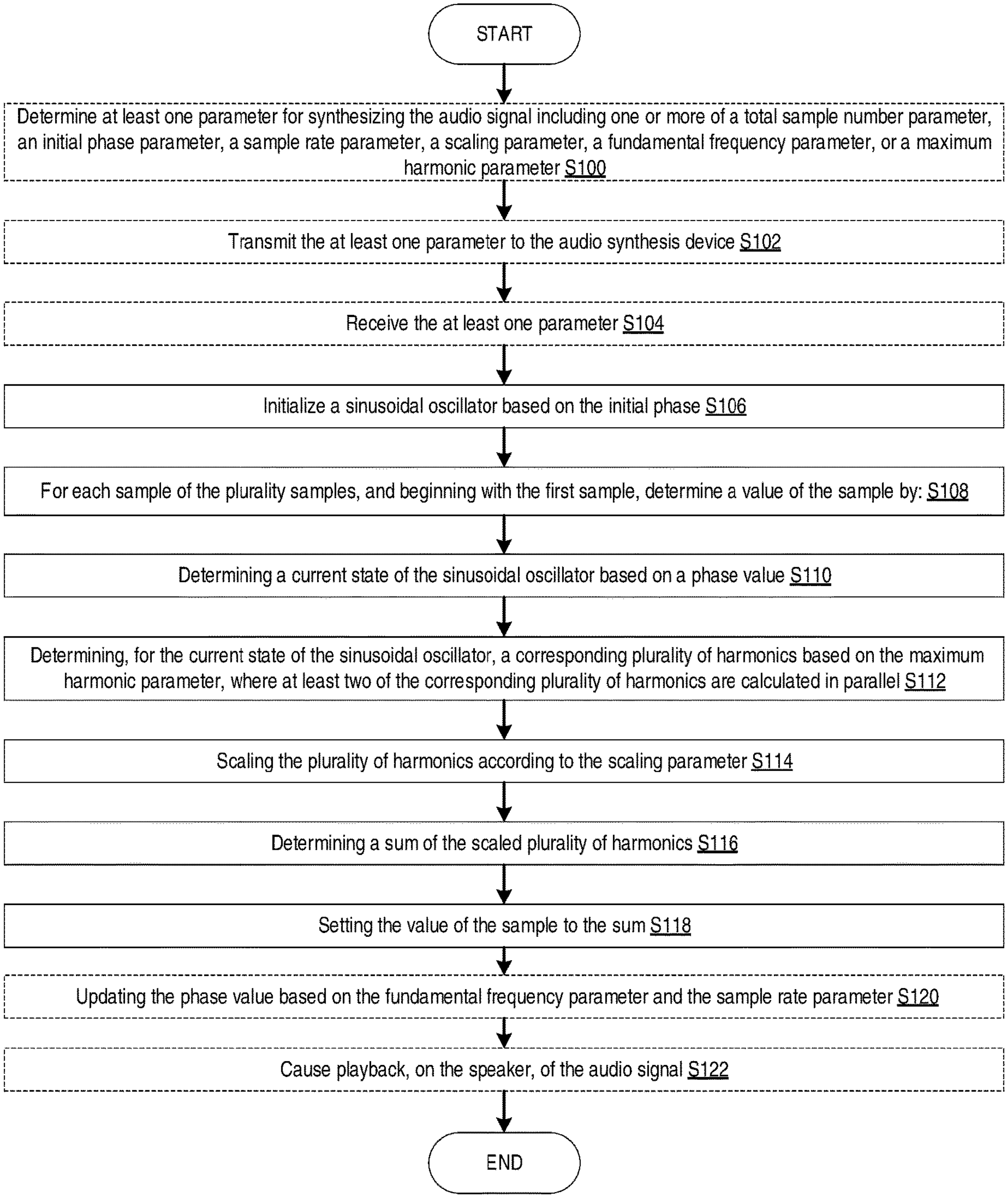
FIG. 4 is a flowchart of an example process in an example system including a control device and an audio synthesis device, according to some embodiments of the present disclosure.

FIG. 4 illustrates a flowchart of an example process (i.e., method) implemented in a system 10 by control device 12, audio synthesis device 16, and speaker 20, according to some embodiments of the present disclosure, for synthesizing an audio signal comprising a plurality samples ordered in a time domain from a beginning sample to a last sample. Steps that are optional in this particular embodiment are depicted in FIG. 4 with a dashed line. One or more other steps may be optional in other embodiments. One or more blocks described herein may be performed by one or more elements of control device 12 such as by one or more of processing circuitry 28, parameterization unit 14, and/or communication interface 26, by one or more elements of audio synthesis device 16 such as by one or more of processing circuitry 40, synthesis unit 18, parallelized harmonic generator 19, and/or communication interface 38. Control device 12 is configured to determine (Block S100) at least one parameter for synthesizing the audio signal including one or more of a total sample number parameter, an initial phase parameter, a sample rate parameter, a scaling parameter, a fundamental frequency parameter, and/or a maximum harmonic parameter, and transmit (Block S102) the at least one parameter to the audio synthesis device.

Audio synthesis device 16 is configured to receive (Block S104) the at least one parameter. Audio synthesis device 16 is configured to initialize (Block S106) a sinusoidal oscillator based on the initial phase parameter. For each sample of the plurality samples, and beginning with the beginning sample, audio synthesis device 16 is configured to determine (Block S108) a value of the sample by determining (Block S110) a current state of the sinusoidal oscillator based on a phase value, determining (Block S112), for the current state of the sinusoidal oscillator, a corresponding plurality of harmonics based on the maximum harmonic parameter, where at least two of the corresponding plurality of harmonics are calculated in parallel (e.g., using Chebyshev polynomial relations, as described herein), scaling (Block S114) the plurality of harmonics according to the scaling parameter, determining (Block S116) a sum of the scaled plurality of harmonics, setting (Block S118) the value of the sample to the sum, and updating (Block S120) the phase value based on the fundamental frequency parameter and the sample rate parameter. Audio synthesis device 16 is configured to cause playback (Block S122), on the speaker, of the audio signal.

In some embodiments, the audio synthesis device 16 is configured to, for each sample, prior to determining the sum of the scaled plurality of harmonics, further scaling the plurality of harmonics by a frequency-dependent fading envelope. In some embodiments, the scaling parameter comprises a vector of Fourier coefficients corresponding to one of a square wave, a pulse wave, a triangle wave, or a sawtooth wave.

In some embodiments, audio synthesis device 16 is configured to determine, for each sample, the corresponding plurality of harmonics by computing a plurality of Chebyshev polynomials, at least two of the plurality of Chebyshev polynomials being computed in parallel. In some embodiments, the number of harmonics is determined based on a fundamental frequency parameter and a sample rate parameter. In some embodiments, the audio synthesis device 16 is further configured to determine the scaling parameter based on a plurality of Chebyshev polynomials, at least two of the plurality of Chebyshev polynomials being computed in parallel.

Embodiments of the present disclosure may be further described according to the following examples and implementations. One or more control device 12 functions described below may be performed by one or more of processing circuitry 28, parameterization unit 14, and/or communication interface 26. One or more audio synthesis device 16 functions described below may be performed by one or more of processing circuitry 40, synthesis unit 18, parallelized harmonic generator 19, and/or communication interface 38.

In some embodiments, an application of the same parallel form in computing (e.g., by control device 12 and/or audio synthesis device 16) the harmonic amplitudes of the pulse wave may facilitate modulation of the duty cycle.

In some embodiments, a running time relative to some existing additive synthesis techniques may enable more efficient real-time operation by, e.g., by control device 12 and/or audio synthesis device 16, as compared to some existing systems.

In some embodiments, a real-time modulation (e.g., by control device 12 and/or audio synthesis device 16) of an alert-tone parameter may convey information immediately to the user, for example, the severity of an alert or the degree of change of a sensor reading.

In some embodiments, a real-time synthesis may facilitate the creation and/or audition of custom tones directly on a host device (e.g., a control device 12 and/or audio synthesis device 16), for example, a custom door-chime tone that is played on a home automation device, such as a doorway entry panel, based on, e.g., a facial recognition performed or received by the device. In this scenario, the doorway entry panel may correspond to, and/or may be in communication with, the audio synthesis device 16 and/or control device 12.

In some embodiments, using additive synthesis, a tone description may be parameterized (e.g., by control device 12, which may communicate one or more such parameters to audio synthesis device 16 for processing and/or storage), and thus may consume far less nonvolatile storage than would be required using, e.g., an existing wavetable approach. Thus, embodiments of the present disclosure may provide lower cost and less time consuming over-the-air software updates, especially in systems that feature a large number of tones, as compared to some existing systems.

A property of Chebyshev polynomials of the first kind, denoted $T_k(x)$, where k is a non-negative integer equal to the degree of the polynomial, is that $T_k(\cos(a))=\cos(ka)$. Therefore, given the digital samples of a sinusoid, x[n], its $k^{th}$ harmonic may be obtained (e.g., by control device 12 and/or audio synthesis device 16) by computing $T_k(x[n])$.

The computational complexity of $T_k(x)$ increases with k; for example, $T_2(x)=2x^2-1$, while $T_7(x)=64x^7-112x^5+56x^3-7x$. Thus, if all $T_k(x)$ for k=0 through some number M are to be computed, the recurrence relation may require fewer computations as compared to direct evaluation, as illustrated in the below example equations:

$$T_0(x) = 1 \quad \text{(Eq. 1)}$$

$$T_1(x) = x \quad \text{(Eq. 2)}$$

$$T_k(x) = 2xT_{k-1}(x) - T_{k-2}(x), \text{ for } k = 2 \text{ through } M \quad \text{(Eq. 3)}$$

Since each value $T_k(x)$ is a function of the preceding two values, and the $T_k(x)$ must typically be computed consecutively, the running time may therefore be proportional to M.

To reduce the running time, the following equations may be utilized, which may be derived from the product of $T_k(x)$ and $T_{k+2}(x)$:

$$T_{2k}(x) = 2T_k^2(x) - 1 \quad \text{(Eq. 4)}$$

$$T_{2k+1}(x) = 2T_k(x)T_{k+1}(x) - x \quad \text{(Eq. 5)}$$

One implication of Equations (4) and (5) is that beginning with $T_2(x)$, each calculation of N harmonics produces sufficient results to calculate the succeeding 2N harmonics. Thus, the calculations of the $T_k(x)$ (e.g., as performed by control device 12 and/or audio synthesis device 16) may be mapped onto $\log_2(M)$ stages, where stage n generates in parallel $2^n$ results, $T_{2^n+1}$ through $T_2^{(n+1)}$, for n=0 through log 2(M)−1. In some embodiments, Equations (1), (2), and (4) may be computed, e.g., by control device 12 and/or audio synthesis device 16, in parallel at stage 0, since Equations (1) and (2) consist of assignment operations, and Equation (4) can be computed using the known value of $T_1(x)=x$.

For example, using the shorthand "k→2k" for Equation (4) and "(k, k+1)→2k+1" for Equation (5), the operations in the case of M=64 may be mapped (e.g., by control device 12 and/or audio synthesis device 16) to form a parallelized harmonic generator as follows:

TABLE 1

Example Parallelized Computation of 64 Harmonics

| Stage | Operations | | | | |
|---|---|---|---|---|---|
| 0 | $T_0(x)$ | $T_1(x)$ | $T_2(x)$ | | |
| 1 | (1, 2)→3 | 2→4 | | | |
| 2 | (2, 3)→5 | 3→6 | (3, 4)→7 | 4→8 | |
| 3 | (4, 5)→9 | 5→10 | (5, 6)→11 | 6→12 | ‖ |
| | (6, 7)→13 | 7→14 | (7, 8)→15 | 8→16 | |
| 4 | (8, 9)→17 | 9→18 | (9, 10)→19 | 10→20 | ‖ |
| | (10, 11)→21 | 11→22 | (11, 12)→23 | 12→24 | ‖ |
| | (12, 13)→25 | 13→26 | (13, 14)→27 | 14→28 | ‖ |
| | (14, 15)→29 | 15→30 | (15, 16)→31 | 16→32 | |
| 5 | (16, 17)→23 | 17→34 | (17, 18)→35 | 18→36 | ‖ |
| | (18, 19)→37 | 19→38 | (19, 20)→39 | 20→40 | ‖ |
| | (20, 21)→41 | 21→42 | (21, 22)→43 | 22→44 | ‖ |
| | (22, 23)→45 | 23→46 | (23, 24)→47 | 24→48 | ‖ |
| | (24, 25)→49 | 25→50 | (25, 26)→51 | 26→52 | ‖ |
| | (26, 27)→53 | 27→54 | (27, 28)→55 | 28→56 | ‖ |
| | (28, 29)→57 | 29→58 | (29, 30)→59 | 30→60 | ‖ |
| | (30, 31)→61 | 31→62 | (31, 32)→63 | 32→64 | |

In some embodiments, the stages may be completed in succession, and operations separated by the double pipe symbol, "‖", in Table 1, are performed (e.g., by control device 12 and/or audio synthesis device 16) in parallel; e.g., "D‖E‖F" indicates that D, E, and F are performed in parallel. A double pipe at the end of a line indicates that parallelism continues with the following line. The results of each stage may be available to any succeeding stages.

A running time proportional to log (M) may be achieved using full parallelism as demonstrated above. Otherwise, a time advantage over the standard recurrence relation is achieved through any mapping where at least two $T_k(x)$ are computed in parallel. A variety of configurations/mappings may be utilized. For example, the maximum number of operations performed in parallel may be constrained to 4. In that case, one example mapping for M=64 may be as follows:

TABLE 2

Example Parallelized Computation of 64 Harmonics, 4-Operation Constraint

| Stage | Operations | | | |
|---|---|---|---|---|
| 0 | $T_0(x)$ | $T_1(x)$ | $T_2(x)$ | |
| 1 | (1, 2)→3 | 2→4 | | |
| 2 | (2, 3)→5 | 3→6 | (3, 4)→7 | 4→8 |
| 3 | (4, 5)→9 | 5→10 | (5, 6)→11 | 6→12 |
| | (6, 7)→13 | 7→14 | (7, 8)→15 | 8→16 |
| 4 | (8, 9)→17 | 9→18 | (9, 10)→19 | 10→20 |
| | (10, 11)→21 | 11→22 | (11, 12)→23 | 12→24 |
| | (12, 13)→25 | 13→26 | (13, 14)→27 | 14→28 |
| | (14, 15)→29 | 15→30 | (15, 16)→31 | 16→32 |
| 5 | (16, 17)→23 | 17→34 | (17, 18)→35 | 18→36 |
| | (18, 19)→37 | 19→38 | (19, 20)→39 | 20→40 |
| | (20, 21)→41 | 21→42 | (21, 22)→43 | 22→44 |
| | (22, 23)→45 | 23→46 | (23, 24)→47 | 24→48 |
| | (24, 25)→49 | 25→50 | (25, 26)→51 | 26→52 |
| | (26, 27)→53 | 27→54 | (27, 28)→55 | 28→56 |
| | (28, 29)→57 | 29→58 | (29, 30)→59 | 30→60 |
| | (30, 31)→61 | 31→62 | (31, 32)→63 | 32→64 |

In this example, the running time may be proportional to ~M/4.

Other example configurations may be used for the parallelized computation of harmonics, e.g., using 8 operations at a time, 16 operations at a time, etc., which may be performed using the parallelized harmonic generator 19, as described herein.

In some embodiments, control device 12 and/or audio synthesis device 16 may be support configurations for a digital tone synthesizer technique that incorporates a parallelized harmonic generator and operates according to the following example algorithm:

Initialization:
- Let N equal the desired duration of the tone, in samples;
- Let p equal the desired initial phase of the tone to be produced;
- Let $F_s$ equal the sample rate, in samples per second;

Sample-Update Loop:
- For n=0 through N−1,
  - Update sinusoidal oscillator, x=sin (p);
  - Let f equal the current desired fundamental frequency, in Hz;
  - Let M equal the index of the maximum desired harmonic;
  - Using the parallelized harmonic generator, calculate all harmonics of x, for harmonic index=1 through M, and store the result in vector, H;
  - Let A be a vector of length M containing the current desired harmonic amplitudes;
  - Multiply each harmonic H[k] by its corresponding amplitude, A[k], for k=1 through M;
  - Compute the sum, y, of the scaled harmonics;
  - Output y;
  - Update the phase: $p+=2\pi f/F_s$;

The sinusoidal oscillator x is calculated (e.g., by control device 12 and/or audio synthesis device 16) using a suitably efficient method, such as polynomial approximation, lookup table interpolation, or an algorithm such as CORDIC. The units of the phase and its increment may be adjusted (e.g., by control device 12 and/or audio synthesis device 16) as necessary according to the requirements of the chosen method. Additionally, the phase may be taken modulo some value (e.g., if the phase is specified in units of radians, the phase may be taken modulo 2π).

The fundamental frequency may be computed (e.g., by control device 12 and/or audio synthesis device 16) outside the sample-update loop described above if it is fixed; otherwise, it may be computed inside the loop, as shown in the above example, to allow modulation.

To avoid aliasing, the maximum harmonic index M may be chosen such that the frequency of harmonic M does not exceed the Nyquist frequency, $F_s/2$, for example:

$$M = \text{floor}\left(F_s/(2f)\right) \quad \text{(Eq. 6)}$$

M may be further constrained to some maximum value. For example, M may be further constrained to some maximum value less than the value that is derived using (Eq. 6).

The vector A (e.g., a scaling parameter) may be initialized (e.g., by control device 12 and/or audio synthesis device 16) prior to the sample-update loop, or its elements may be updated dynamically within the loop. For audio synthesis device 16 to generate a particular waveform, such as a square, pulse, triangle, or sawtooth wave, the elements of A may be set (e.g., by control device 12 and/or audio synthesis device 16) to the Fourier coefficients of the waveform, up to a desired maximum index. A window may be applied (e.g., by control device 12 and/or audio synthesis device 16) to reduce ringing artifacts, e.g., due to the Gibbs phenomenon.

For example, the Fourier coefficients of an example pulse wave may be computed as follows:

$$A_{pulse}[k] = 2\sin(\pi kd)/(\pi k), \text{ for } k = 1 \text{ through } M, \quad \text{(Eq. 7)}$$

where d is the duty cycle, and 0<d<1.

In some embodiments, the pulse wave coefficients may be computed (e.g., by control device 12 and/or audio synthesis device 16) using an efficient parallel form of the Chebyshev polynomials of the second kind, denoted $U_k(x)$, and the well-known property, $U_k(\cos(a))\sin(a)=\sin((k+1)a)$, facilitating modulation of the duty cycle within the sample-update loop. For example, the $U_k(x)$ may be computed (e.g., by control device 12 and/or audio synthesis device 16) as follows:

Let x equal cos(πd);

Compute $T_k(x)$, for k=0 through M, using the parallel form described previously;

Extract the even elements of $T_k(x)$ into the vector $T_{even}$ and the odd elements into the vector $T_{odd}$;

Compute the prefix sum of $T_{even}$ and the prefix sum of $T_{odd}$, preferably using a parallel algorithm, such as the Hillis and Steele Parallel Scan Algorithm. Store the results in vectors $S_{even}$ and $S_{odd}$;

Calculate the $U_k(x)$:

$$U_{2k}(x) = 2S_{even}[k] - 1, \text{ for } k = 0 \text{ through floor}\left(M/2\right) + 1;$$

$$U_{2k+1}(x) = 2S_{odd}[k], \text{ for } k = 0 \text{ through floor } \left((M+1)/2\right);$$

The pulse wave coefficients may be obtained as follows:

Let y equal sin(πd);

$$\text{Set } A_{pulse}[k] = 2yU_{k-1}(x)/(\pi k), \text{ for } k = 1 \text{ through } M.$$

The coefficients may be pre-calculated (e.g., by control device 12 and/or audio synthesis device 16) in the case of a fixed duty cycle or may be computed (e.g., by control device 12 and/or audio synthesis device 16) within the sample-update loop to enable duty-cycle modulation. The sine and cosine terms may be calculated (e.g., by control device 12 and/or audio synthesis device 16) using a suitably efficient method, as was the case for the sinusoidal oscillator described above.

To avoid discontinuities caused by the abrupt addition or removal of harmonics during a frequency sweep when M is chosen according to Equation (6), each harmonic amplitude may be configured to fade to zero as the frequency of the harmonic increases towards the Nyquist frequency.

In some embodiments, a frequency-dependent fade envelope for affected harmonics may be derived (e.g., by control device 12 and/or audio synthesis device 16) as follows:

Let $f_1$ equal the frequency at which the fade begins; e.g., $f_1=0.9*F_s/2$;

Let $f_2$ equal the frequency at which the fade has decreased to 0; e.g., $f_2=F_s/2$;

Let f equal the fundamental frequency;

Let c equal $1/(f_2-f_1)$;

Let K equal min (M, floor($f_1$/f));

Let E be the length-M vector of fade envelopes;

for k=K+1 through M, $$E[k] = \max(0.0, c(f_2 - kf));$$

For example, in some embodiments, in the sample-update loop, H[k] is multiplied (e.g., by control device 12 and/or audio synthesis device 16) by E[k], for k=K+1 through M, along with the multiplication by A[k], for k=1 through M.

It may be preferable to perform a series of independent operations using parallelism, e.g., where one or more calculations is performed simultaneously in an efficient order such that computation time and/or complexity is reduced. This principle may apply, for example, to the element-wise multiplication of H by A, the calculation of the E[k], the element-wise multiplication of H by E, the final summation, y, of scaled harmonics, the calculation of the $U_k(x)$ from $S_{even}$ and $S_{odd}$, and/or the calculation of the $A_{pulse}[k]$ from the $U_k(x)$.

The concepts described herein may be embodied as a method, data processing system, computer program product and/or computer storage media storing an executable computer program. Any process, step, action and/or functionality described herein may be performed by, and/or associated to, a corresponding module, which may be implemented in software and/or firmware and/or hardware. Furthermore, the disclosure may take the form of a computer program product on a tangible computer usable storage medium having computer program code embodied in the medium that can be executed by a computer. Any suitable tangible computer readable medium may be utilized including hard disks, CD-ROMs, electronic storage devices, optical storage devices, or magnetic storage devices.

Some embodiments are described herein with reference to flowchart illustrations and/or block diagrams of methods, systems and computer program products. Each block of the flowchart illustrations and/or block diagrams, and combinations of blocks in the flowchart illustrations and/or block diagrams, can be implemented by computer program instructions. These computer program instructions may be provided to a processor of a general purpose computer (to thereby create a special purpose computer), special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable memory or storage medium that can direct a computer or other programmable data processing apparatus to function in a particular manner, such that the instructions stored in the computer readable memory produce an article of manufacture including instruction means that implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions/acts specified in the flowchart and/or block diagram block or blocks.

The functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Additionally, one or more blocks may be omitted in various embodiments. Although some of the diagrams include arrows on communication paths to show a primary direction of communication, it is to be understood that communication may occur in the opposite direction to the depicted arrows.

Computer program code for carrying out operations of the concepts described herein may be written in an object oriented programming language such as Python, Java® or C++. However, the computer program code for carrying out operations of the disclosure may also be written in procedural programming languages, such as the "C" programming language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

Many different embodiments have been disclosed herein, in connection with the above description and the drawings. It would be unduly repetitious and obfuscating to literally describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

In addition, unless mention was made above to the contrary, it should be noted that all of the accompanying drawings are not to scale. A variety of modifications and variations are possible in light of the above teachings and following claims.

What is claimed is:

1. An audio synthesis device, comprising:

at least one processor; and at least one memory storing instructions that, when executed by the at least one processor, are configured to cause the at least one processor to:

receive at least one parameter for synthesizing an audio signal;

initialize a sinusoidal oscillator based on the at least one parameter;

calculate a first plurality of harmonics based on the sinusoidal oscillator, at least two successive harmonics of the first plurality of harmonics being calculated in parallel;

scale the first plurality of harmonics according to a scaling parameter;

determine a first sum of the first plurality of scaled harmonics to generate a first sample of a plurality of samples; and cause playback, on a speaker, of an audio signal comprising at least the first sample.

2. The audio synthesis device of claim 1, wherein the scaling parameter comprises a vector of Fourier coefficients corresponding to one of:

a square wave;

a pulse wave;

a triangle wave; or a sawtooth wave.

3. The audio synthesis device of claim 1, wherein the first plurality of harmonics comprises a number of harmonics, the number of harmonics being calculated based on a fundamental frequency parameter and a sample rate parameter.

4. The audio synthesis device of claim 1, wherein the at least one parameter comprises one or more of:

a total sample number parameter;

an initial phase parameter;

a sample rate parameter;

the scaling parameter;

a fundamental frequency parameter; and a maximum harmonic parameter.

5. The audio synthesis device of claim 1, wherein the first plurality of harmonics is based on a first plurality of Chebyshev polynomials.

6. The audio synthesis device of claim 5, wherein the instructions are further configured to cause the at least one processor to determine the scaling parameter based on a second plurality of Chebyshev polynomials, the second plurality of Chebyshev polynomials being of a different kind than a kind of the first plurality of Chebyshev polynomials.

7. The audio synthesis device of claim 1, wherein the instructions are further configured to cause the at least one processor to determine the scaling parameter based on a second plurality of harmonics, at least two of the second plurality of harmonics being calculated in parallel.

8. The audio synthesis device of claim 1, wherein the instructions are further configured to cause the at least one processor to:

calculate a second plurality of harmonics based on the sinusoidal oscillator, at least two of the second plurality of harmonics being calculated in parallel;

scale the second plurality of harmonics according to the scaling parameter;

determine a second sum of the second plurality of scaled harmonics to generate a second sample of the plurality of samples; and cause playback, on the speaker, of the audio signal comprising at least the second sample.

9. The audio synthesis device of claim 8, wherein the instructions are further configured to cause the at least one processor to update the sinusoidal oscillator prior to determining the second plurality of harmonics based on a phase value, the phase value being determined based on a fundamental frequency parameter.

10. The audio synthesis device of claim 1, wherein the audio signal comprises the plurality of samples ordered in a time domain from a beginning sample to a last sample.

11. The audio synthesis device of claim 1, wherein the instructions are further configured to cause the at least one processor to prior to determining the first sum, further scale the first plurality of harmonics by a frequency-dependent fading envelope.

12. The audio synthesis device of claim 1, wherein the at least two of the first plurality of harmonics is calculated in parallel according to a Chebyshev polynomial relationship.

13. A method implemented in an audio synthesis device, the method comprising:

receiving at least one parameter for synthesizing an audio signal;

initializing a sinusoidal oscillator based on the at least one parameter;

calculating a first plurality of harmonics based on the sinusoidal oscillator, at least two successive harmonic of the first plurality of harmonics being calculated in parallel;

scaling the first plurality of harmonics according to a scaling parameter;

determining a first sum of the first plurality of scaled harmonics to generate a first sample of a plurality of samples; and causing playback, on a speaker, of an audio signal comprising at least the first sample.

14. The method of claim 13, wherein the scaling parameter comprises a vector of Fourier coefficients corresponding to one of:

a square wave;

a pulse wave;

a triangle wave; or a sawtooth wave.

15. The method of claim 13, wherein the first plurality of harmonics comprises a number of harmonics, the number of harmonics being calculated based on a fundamental frequency parameter and a sample rate parameter.

16. The method of claim 13, wherein the first plurality of harmonics is based on a first plurality of Chebyshev polynomials; and the method further comprises determining the scaling parameter based on a second plurality of Chebyshev polynomials, the second plurality of Chebyshev polynomials being of a different kind than a kind of the first plurality of Chebyshev polynomials.

17. The method of claim 13, further comprising determining the scaling parameter based on a second plurality of harmonics, at least two of the second plurality of harmonics being calculated in parallel.

18. The method of claim 13, further comprising:

updating the sinusoidal oscillator prior to calculating a second plurality of harmonics based on a phase value, the phase value being determined based on a fundamental frequency parameter;

calculating the second plurality of harmonics based on the sinusoidal oscillator, at least two of the second plurality of harmonics being calculated in parallel;

scaling the second plurality of harmonics according to the scaling parameter;

determining a second sum of the second plurality of scaled harmonics to generate a second sample of the plurality of samples; and causing playback, on the speaker, of the audio signal comprising at least the second sample.

19. The method of claim 13, further comprising, prior to determining the first sum, further scaling the first plurality of harmonics by a frequency-dependent fading envelope.

20. The method of claim 13, wherein the at least two of the first plurality of harmonics is calculated in parallel according to a Chebyshev polynomial relationship.

* * * * *